(12) United States Patent
Bennett et al.

(10) Patent No.: US 10,073,820 B2
(45) Date of Patent: Sep. 11, 2018

(54) SYSTEMS, METHODS, AND INTERFACES FOR PAGINATION AND DISPLAY ON AN ACCESS DEVICE

(75) Inventors: Daniel Bennett, Rosemount, MN (US); John Scott Daup, Eagan, MN (US)

(73) Assignee: THOMSON REUTERS GLOBAL RESOURCES UNLIMITED COMPANY, Baar (CH)

( * ) Notice: Subject to any disclaimer, the term of this patent is extended or adjusted under 35 U.S.C. 154(b) by 1152 days.

(21) Appl. No.: 12/982,954

(22) Filed: Dec. 31, 2010

(65) Prior Publication Data
US 2012/0173960 A1    Jul. 5, 2012

(51) Int. Cl.
G06F 17/00    (2006.01)
*G06F 17/21*    (2006.01)
*G06F 17/22*    (2006.01)

(52) U.S. Cl.
CPC ........ *G06F 17/217* (2013.01); *G06F 17/2229* (2013.01); *G06F 17/2247* (2013.01)

(58) Field of Classification Search
CPC .............. G06F 17/217; G06F 17/2229; G06F 17/2247
USPC .................................................. 715/234, 251
See application file for complete search history.

(56) References Cited

U.S. PATENT DOCUMENTS

| | | | | |
|---|---|---|---|---|
| 5,819,301 A * | 10/1998 | Rowe | .................... | G06F 17/211 707/999.01 |
| 5,826,025 A * | 10/1998 | Gramlich | .............. | G06F 17/241 707/999.004 |
| 6,175,845 B1 * | 1/2001 | Smith | ..................... | G06F 17/21 715/210 |
| 6,971,062 B1 * | 11/2005 | Tolpin | ............... | G06F 17/30861 707/E17.107 |
| 7,028,258 B1 * | 4/2006 | Thacker | ................ | G06F 17/217 345/660 |

(Continued)

FOREIGN PATENT DOCUMENTS

| WO | WO 2010077701 A1 * | 7/2010 |
| WO | 2012/092435 A1 | 7/2012 |

OTHER PUBLICATIONS

TAG Index, "CSS Properties: CSS Codes and Examples", Jun. 1, 2008, 2 pages; http://web.archive.org/web/20080601095520/http://www.tagindex.net/css/page/page_break.html.*

(Continued)

*Primary Examiner* — Cesar B Paula
*Assistant Examiner* — David Faber
(74) *Attorney, Agent, or Firm* — Bartholomew J. Divita (57) ABSTRACT

A method executed on an access device includes receiving a markup language file where the markup language file contains a portion of primary text and a portion of secondary text. The method also includes receiving a page number map and utilizing the page number map to render the portion of primary text associated with a print page and the portion of secondary text associated with the print page. Another exemplary method includes displaying the portion of primary text associated with a print page and the portion of secondary text associated with the print page. In yet another exemplary method, the page number map contains a first print page break lineage and a first character offset for the portion of primary text and a second print page break lineage and a second character offset for the portion of secondary text.

14 Claims, 6 Drawing Sheets

(56) References Cited

U.S. PATENT DOCUMENTS

| | | | |
|---|---|---|---|
| 7,512,879 B2* | 3/2009 | Weil | G06F 17/217 715/251 |
| 8,126,878 B2* | 2/2012 | Krasnow | G06F 17/2247 707/722 |
| 8,423,889 B1* | 4/2013 | Zagorie | G06F 17/30905 715/255 |
| 8,621,390 B1* | 12/2013 | Findley | G06F 3/0483 715/818 |
| 2002/0116421 A1* | 8/2002 | Fox | G06F 17/21 715/201 |
| 2002/0152215 A1 | 10/2002 | Clark et al. | |
| 2004/0006743 A1* | 1/2004 | Oikawa | G06F 17/212 715/255 |
| 2004/0205623 A1* | 10/2004 | Weil | G06F 17/217 715/251 |
| 2005/0091585 A1* | 4/2005 | Parikh | G06F 9/4443 715/251 |
| 2005/0096938 A1 | 5/2005 | Slomkowski et al. | |
| 2006/0056334 A1* | 3/2006 | Yuan | G06F 17/217 370/328 |
| 2009/0013247 A1 | 1/2009 | Carro | |
| 2009/0043807 A1* | 2/2009 | Bittles | G06F 17/30911 |
| 2009/0046918 A1* | 2/2009 | Dejean | G06K 9/2054 382/135 |
| 2009/0150769 A1* | 6/2009 | Konnola | G06F 17/30864 715/251 |
| 2009/0239202 A1 | 12/2009 | Stone | |
| 2010/0033772 A1* | 2/2010 | Borison et al. | 358/474 |
| 2010/0161653 A1* | 6/2010 | Krasnow | G06F 17/2247 707/769 |
| 2010/0281076 A1* | 11/2010 | Pan | G06F 17/30911 707/811 |
| 2011/0029435 A1* | 2/2011 | Ronen | G06Q 10/10 705/53 |
| 2012/0198330 A1* | 8/2012 | Koppel | G06F 17/217 715/251 |

OTHER PUBLICATIONS

Hegaret et al, "What is Document Object Model?", Nov. 7, 2003, W3C, p. 1-6; http://www.w3.org/TR/2003/CR-DOM-Level-3-Core-20031107/introduction.html.*

EBW, "Check metadata | EBW Knowledge Base", pub. Jul. 1, 2010, pp. 1-4, http://web.archive.org/web/20130307101744/http://electricbookworks.com/kb/creating-epub-from-indesign/after-indesign-export-to-epub/add-metadata/.*

TAG Index, "CSS Properties: CSS Codes and Examples", Jun. 1, 2008, 3 pages; http://web.archive.org/web/20080601095520/http://www.tagindex.net/css/page/page_break.html.*

PCT International Preliminary Report on Patentability, dated Jul. 2, 2013, 9 pages.

PCT International Search Report and Written Opinion of the International Searching Authority, dated Mar. 13, 2012, 9 pages.

First Patent Examination Report issued in related Australia Patent Application No. 2011352078, dated Jan. 19, 2016, 4 pages.

Response to First Examination Report filed in related Australia Patent Application No. 2011352078, dated Aug. 26, 2016, 19 pages.

Notice of Acceptance issued in related Australia Patent Application No. 2011352078, dated Sep. 28, 2016, 2 pages.

Notice of grant for patent issued in related Australia Patent Application No. 2011352078, dated Jan. 27, 2017, 2 pages.

First Office Action issued in related Canadian Patent Application No. 2823624, dated May 20, 2015, 3 pages.

Response to First Office Action filed in related Canadian Patent Application No. 2823624, dated Nov. 19, 2015, 16 pages.

Second Office Action issued in related Canadian Patent Application No. 2823624, dated Jun. 16, 2016, 5 pages.

Response to second Office Action filed in related Canadian Patent Application No. 2823624, dated Dec. 5, 2016, 18 pages.

Third Office Action issued in related Canadian Patent Application No. 2823624, dated Apr. 21, 2017, 4 pages.

Extended European search Report issued in related European Patent Application No. 11853461.9, dated Oct. 29, 2015, 8 pages.

Communication pursuant to Rules 70(2) and 70a(2) EPC issued in related European Patent Application No. 11853461.9, dated Nov. 17, 2015, 1 page.

Response to Communication pursuant to Rules 70(2) and 70a(2) EPC filed in related European Patent Application No. 11853461.9, dated May 27, 2016, 20 pages.

Response to third Office Action filed in related Canadian Patent Application No. 2823624, dated Oct. 11, 2017, 5 pages.

Fourth Office Action issued in related Canadian Patent Application No. 2823624, dated Mar. 9, 2018, 5 pages.

* cited by examiner

```
Page requested_page = pagemap.pageAt (page)
Page next_page = pagemap.pageAt (page+1)

// different rules if on last page
if next_page != null && requested_page.src == next_page.src then   // both pages are in same document
    body = openingElements (request_page.body_xpath
        + substring (requested_page.doc, requested_page.body_offset,next_page.body_offset)
        + ClosingElements (next_page.body_xpath)
    if requested_page.hasfootnotes && next_page.hasfootnotes then
        footnotes = openingElements (request_page.footnote_xpath)
            + substring (requested_page.doc, requested_page.footnote_offset,
                next_page.footnote_offset)
            + closingElements (next_page.footnote_xpath)
    else if requested_page.hasFootnotes then
        footnotes = openingelements (requested_page.footnote_xpath)
            + substring (requested_page.doc, requested_page.footnote_offset,
                requested_page.doc.length)
        footnotes = extractPage (page, footnotes)
    else
        footnotes = ""
    end
else
    body = openingElements (requested_page.body_xpath)
        + substring (rquested_page.doc,requested_page.body_offset,requested_page.doc.length)
    body = extractPage (page, body)
end extracted_page = "<html><head><title>page</title></head><body>"+body+footnotes+"</body></html>"
```

FIGURE 2A

Commercial Law Treaty

- Front Cover
- Chapter I: Introduction to the Study
- V. Commercial Regulations
- Chapter II. Commercial Law Concepts
- Chapter III: New Developments in the Law Silesia, or, flint blades product Pressigny Grand (Saine et Loire) were transported to Jersey, in the West, and Switzerland or the Rhine Valley in the East.

Also, in the period discussed highlights numerous "factories axes". Just as it was possible to obtain an additional means of making life or extracting flint axes, there existed a similar opportunity to distribute products. In Europe there are concrete testimonies of these articles were distributed by professional dealers. These statements consist of "buried deposits," piles of unused tools, which have been found at archaeological excavations carried out.

11.2 The Bronze Age

The Bronze Phase was a change in the economic structure. The metal is obtained from the mineral melting furnaces and it worked by melting and molding. Copper alloyed with tin and products were distributed systematically more often on the slopes of the mountains, away from metalliferous areas.

In the second millennium BC in central Europe it starts producing vessels made of local minerals for a continental market. Almost simultaneously in the British Isles a similar industry employing Cornish tin and copper Irish to meet local demand and export to the continent emerges.

As Gordon Childe pointed out, the system of rural economy that prevailed in the first period of the second millennium, no local group or tribal chief might normally have been rich enough to have a smith permanent resided locally so supply enough or bronze for their jobs. For the most part, mental vessels have been built and distributed by itinerant smiths, who roamed large areas which produced, or at least perfected, weapons and ornaments, serving individual customers, so molds were found apparently transported axes by street artifices (6).

(6) University of Cambridge, Economic History of Europe, led by Sir John Clapham and Eileen Power, Vol. II, Trade and Industry in the

SYSTEMS, METHODS, AND INTERFACES FOR PAGINATION AND DISPLAY ON AN ACCESS DEVICE

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright ©2010 Thomson Reuters.

TECHNICAL FIELD

Various embodiments of the present invention concern systems, methods and interfaces for paginating and displaying, in particular secondary text, on mobile access device.

BACKGROUND

For ages, books have provided a wealth of information. In 1440, the invention of the Gutenberg printing press revolutionized the book printing world by producing relatively inexpensive books on paper, as opposed to parchment. This infamous idea sparked an information age where other people besides clergy could afford and/or gain access to print books. While several advancements in printing books have occurred over the years, in 1971, Michael Hart, founder of Project. Gutenberg, used a XEROX® Sigma V mainframe computer to create the first digitized, electronic book (herein also referred to as "eBook"). Using the mainframe computer, he typed (i.e., digitized) a copy of the Declaration of Independence. He believed that computers would one day be accessible to the public and decided to make literary works available in electronic form.

Then with the creation of the internet, eBooks started to gain steam. Initially, eBooks were generally written for specific technical areas. For example, the subject matter may have ranged from technical manuals to manufacturing techniques. These eBooks were meant for a small, specific audience and therefore were few and far between. Then around 2001, some major publishing companies finally took notice of the eBook trend. Consequently, electronics hardware manufacturers began to develop eBook reader (herein also referred to "eReader") devices in hopes of capitalizing on the eBook phenomenon. In keeping with this emerging trend, publishers launched online stores and partnered with eReader manufacturers to further establish themselves in the eBook marketplace.

Today, due to the global impact of eBooks, publishers are beginning homogenize eBook publishing formats and eReader device manufacturers are developing new device models every few months to keep up with the competition. In addition, software developers are creating dedicated eReader software that ultimately displays the eBook on a dedicated eReader device or on multi-purpose access devices such as handheld access devices, smartphones and/or game consoles.

Even with all the advancements in the eBook marketplace, one of the concerns when reading eBooks is the display of content on the access device. For some types of content, a reflow style presentation is acceptable. A reflow presentation displays the content over a number of 'virtual,' electronic pages with the number depending on the user selected font size. While an excellent approach for general reading, this is to the detriment of content that relies on page centricity or where page numbers are heavily used for citation. In addition, certain secondary content/text, such as footnotes and/or reference notes, does not correspond to the proper print page. For example, within the legal profession, attorneys search, select and read multiple legal cases. Within these legal cases are various footnotes, regarding a point of law, a citation, etc., and are essential to reading and understanding the case. Moreover, when reading and ultimately citing a legal case, an attorney usually needs to have the print page number to reference the citation properly.

Currently, a known approach to general document display via electronic publishing standards includes treating each page number as an anchor in the flow of the eBook. An anchor is a named location within a markup language document that may be used for navigation within the document. For example, a set of anchors in the markup language document corresponds to print page breaks. The user could use those print page break anchors to navigate to a location in the markup language document where a print page break occurs. While this approach permits navigation to a certain page within the eBook, the approach does not consider secondary content/text such as footnotes and/or other reference notes.

Another known approach is to display the page in an image format. For example, the eBook could be in an image format such as ADOBE® pdf format. While this approach shows the correct allocation of secondary text (i.e., it is an image of the print book), an issue arises when a user wants to resize the font. Since the eBook is in an image format, the user can only zoom in and out on the image which disrupts the user's reading experience.

Other known approaches to displaying, in particular, secondary text, such as footnotes, include: 1) aggregating the footnotes and positioning them at the end of the document, similar to endnotes, or 2) having the footnote text be displayed in a pop up window. In both approaches, a hyperlinked numeral is positioned at the end of the sentence to which the footnote refers. In the first known approach, if the user chooses to select the hyperlinked numeral, the user is navigated to the end of document where either the full footnotes reside or the specific footnote location. In the second known approach, if the user selects the hyperlinked numeral, a pop up window appears with the footnote text. The user then has to close the pop up window to continue reading the primary text. However, both of these known methods have disadvantages. For example, each approach significantly disrupts the user's reading experience by navigating away from the primary content/text. In addition, these approaches do not electronically reflect how the page looked in print which in certain circumstances, such as the example discussed above, is crucial to the reader/user.

Accordingly, the inventor has recognized the necessity for additional improvements in paginating and displaying, particularly reference notes, on a mobile access device.

SUMMARY

A method executed on an access device includes receiving a markup language file where the markup language file contains a portion of primary text and a portion of secondary text. The method also includes receiving a page number map and utilizing the page number map to render the portion of primary text associated with a print page and the portion of secondary text associated with the print page. An additional exemplary method includes purchasing an electronic book where the electronic book contains the markup language file. Another exemplary method includes providing a set of user credentials for authentication and, in response to a successful authentication of the set of user credentials, receiving the markup language file and the page number map. Another exemplary method includes displaying the portion of primary text associated with a print page and the portion of secondary text associated with the print page. In yet another exemplary method, the page number map contains a first print page break lineage and a first character offset for the portion of primary text and a second print page break lineage and a second character offset for the portion of secondary text. In another exemplary method the markup language file is a XML file. In another exemplary method, the portion of primary text is a portion of a legal treatise and the portion of secondary text is at least one footnote. In addition, system, method and interface embodiments are also disclosed.

The systems, methods and interfaces described herein advantageously use electronic access devices, including mobile access devices, to give the user a continuous reading experience. There is no need for the user to initiate a pop up window or to navigate to another section of the document in order to read, for example, footnotes. Additionally, users want the view of the eBook page, including the footnotes, to look similar to the print page version. Therefore, a further advantage includes the eBook page presentation being comparable to the print page presentation without utilizing an image format. Since an image format is not utilized, the user has the ability to resize the font without compromising the integrity of the eBook page presentation, including footnotes. These advantages happen, in part, because of a page number map. The page number map has a print page break lineage and a character offset for a portion of the primary text along with a print page break lineage and a character offset for a portion of the secondary text. This page number map assists the display render module to render and ultimately display the eBook page.

BRIEF DESCRIPTION OF THE DRAWINGS

FIG. 3 is an exemplary interface 300 which corresponds to one or more embodiments of the invention.

DETAILED DESCRIPTION OF THE
EXEMPLARY EMBODIMENT(S)

This description, which incorporates the figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following examples are presented. The term "content" or a "portion of content" includes but is not limited to an electronic document, an eBook, a markup language file, primary text, and secondary text. Types of content may include but are not limited to treatises, American Law Reviews (ALRs), caselaw, footnotes, reference notes, translation notes, and the like. The phrase "print page" exemplifies how a page looks in paper print format. Examples of markup languages, and corresponding markup language files, include HyperText Markup Language (HTML), Extensible Markup Language (XML), Extensible HyperText Markup Language (XHTML) and the like.

Exemplary Document Processing and Information
Retrieval System

Figure 1:
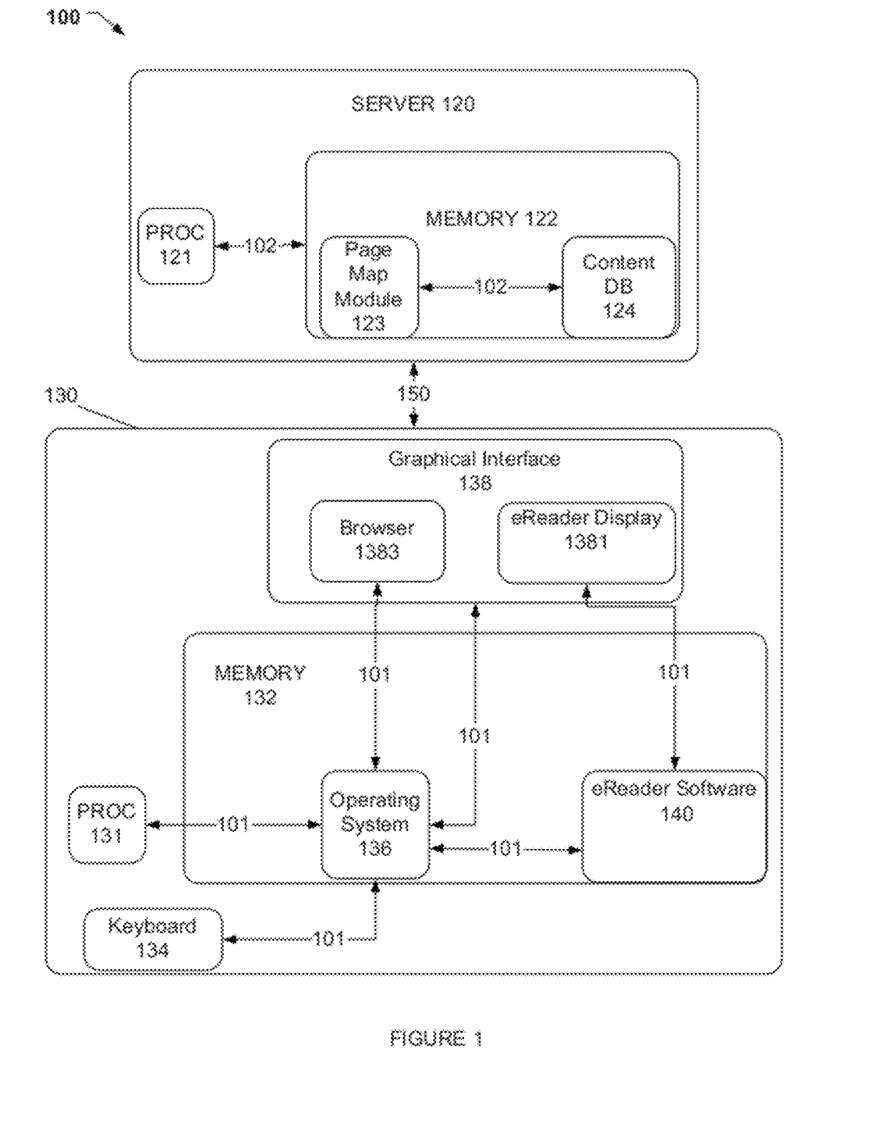
FIG. 1 is an exemplary system 100 which corresponds to one or more embodiments of the invention.

FIG. 1 shows an exemplary system 100, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal transmission channel 150 over a wireless or wireline communications network (not shown) to at least one access device, such as access device 130. For example, a signal transmission channel 150 may be associated with a request to download a piece of content (e.g. a treatise) to access device 130, more particularly to eReader content storage module 140a (see FIG. 1B and corresponding description for further discussion). Server 120 includes a processor 121, a memory 122, a page map module 123, and a content database 124. All of these elements are connected via computer bus 102, which is shown in various pathways throughout the server 120. Computer buses 101 and/or 102 are subsystems that transfer data between the access device's components/elements and/or between multiple access devices 130.

Processor 121 includes one or more local and/or distributed processors, controllers and/or virtual machines. In the exemplary embodiment, processor 121 takes any convenient and/or desirable form known to those skilled in the art. Memory 122 takes the exemplary form of one or more electronic, magnetic, and/or optical data-storage devices and stores a page map module 123, and a content database 124.

Figure 1A:
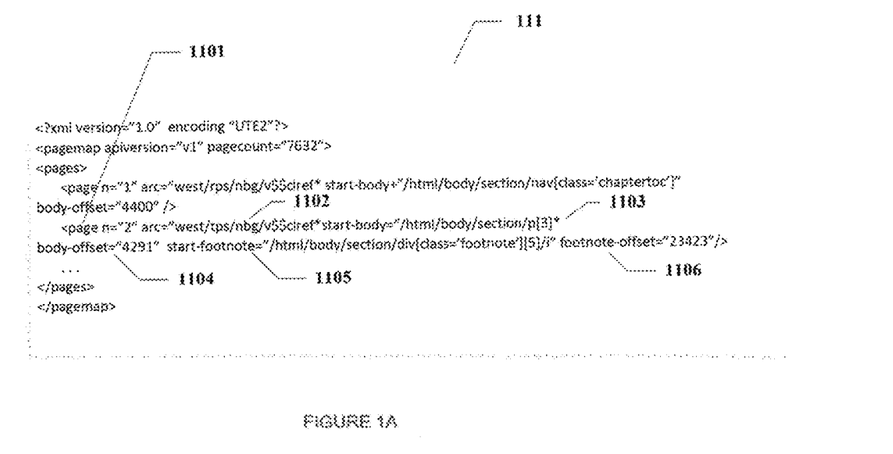
FIG. 1A is an exemplary page number map 111 which corresponds to one or more embodiments of the invention.
Figure 2:
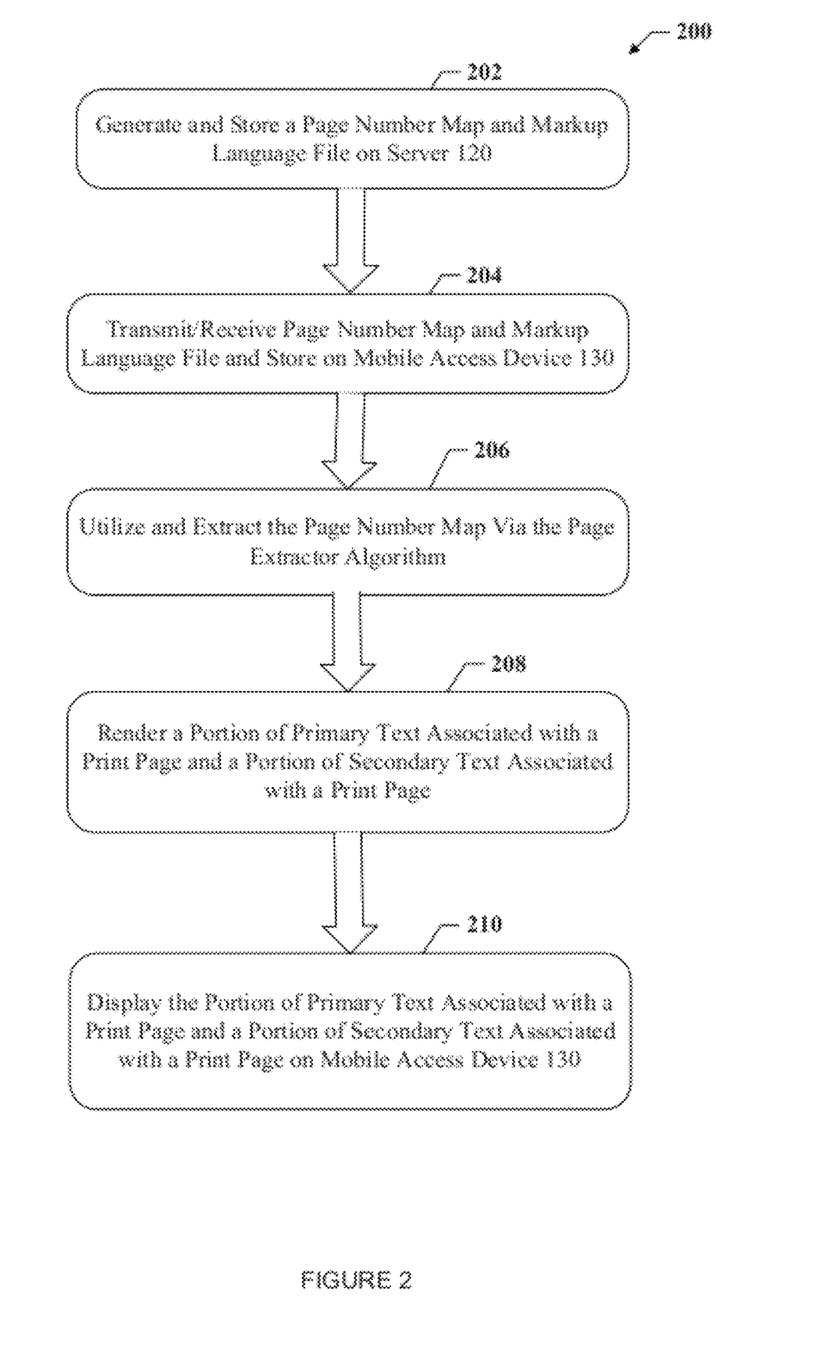
FIG. 2 is an exemplary method 200 which corresponds to one or more embodiments of the invention.

Page map module 123 is configured to generate, via method 200, a page number map 111 (an example of which is shown in FIG. 1A). The page number map 111 is utilized for rendering and displaying electronic pages, similar to print pages, for a particular piece of content. A page number map 111 contains the character offsets and the print page break lineages for primary text in addition to the character offsets and the print page break lineages for secondary text (character offsets and print page break lineages are further illustrated in FIG. 1A and corresponding description). Since secondary text may span separate print pages, two sets of character offsets mentioned above are needed to ensure appropriate rendering and displaying of not only the primary text but also the secondary text. As used herein, rendering, which precedes displaying, includes data processing by an access device that does not contain any user readable display information. The print page break lineage consists of all open XML elements, with attributes, at the given character offset. Exemplary attributes include nodal attributes, node identification, and/or node type. These attributes are used to create a well formed electronic document for rendering. A page number map 111 is only generated if the content supports print page breaks. Put another way, for instance, if the content is in XML, the XML file would include print page break location information and a page number map 111 is generated. If this information is not present, then a page number map 111 is not generated and only a reflow style text presentation is allowed.

FIG. 1A is an exemplary page number map 111 for a markup language file. Sections of the page number map 111 include the print page number reference 1101, the content document identification 1102, the print page break lineage for primary text 1103, the character offset for the primary text 1104, the print page break lineage for secondary text 1105 and the character offset for secondary text 1106. The print page break lineage is the path from the print page break markup element (i.e., node within the markup language file) all the way up to the root of the markup structure. In this instance, the print page break lineage for the primary text is "/html/body/section/nav[class='chaptertoc']" and the print page break lineage for the secondary text is "/html/body/section/div[class='footnote'][5]/i." Character offsets are the indexed position of print page break marker in a string of text within a markup language file. The character offset values begin at zero for the first character and increase. In addition, the character offset value is the character value from the beginning of the markup language file (not from the print page break location). In another embodiment, the page number map 111 includes a total page count to allow the access device 130 to allocate sufficient space in memory 132.

Content database 124 takes the exemplary form of one or more electronic, magnetic, and/or optical data-storage devices. Content database 124 includes content that supports retrieval by page number (i.e., includes print page break information embedded within the markup language file), content that does not support retrieval by page number and/or a sub-set of content that only includes subscriber content. In some embodiments, subscriber content may support retrieval by page number. Subscriber content includes content and related data for controlling, administering, and managing pay-as-you-go and/or subscription based access. For instance, a user may have to purchase an eBook and/or subscribe to an eBook service. The purchased eBook has the format of a markup language file and is stored in the content database 124 until a set of user credentials are authenticated. For instance, user credentials may be a user name and associated password. Once the credentials are successfully authenticated on server 120, the signal transmission channel 150, including the markup language file and the page number map, is transmitted over a wireless or wireline communications network (not shown) to access device 130, in particular eReader content storage module 140a. For purposes described herein, successfully authenticating a set of user credentials means the user credentials were accepted by an authentication system (not shown). This successful authentication allows for receiving and/or transmitting the markup language file and page number map (i.e., the eBook).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® IPAD® tablet, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

A computer readable eReader software 140 (herein also referred to as "eReader software") is stored in memory 132 (e.g. RAM) and/or hard drive (not shown). Memory 132 and hard drive (not shown) are examples of main memory and secondary memory, respectively. Some exemplary embodiments have the eReader software 140 being stored in a computer-readable medium product of any type, in this document, the terms "computer program medium," "computer usable medium," and "computer readable medium" may generally refer to media such as main memory, secondary memory, removable storage drive, and/or a hard disk installed in a hard disk drive. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/tai network circuits. The processor module 131 reads data, instructions, messages or message packets, and other computer readable information from the computer readable medium.

In one exemplary embodiment, memory 132 stores code (machine-readable or executable instructions) for an operating system 136 and eReader software 140. Operating system 136 is coupled to a browser 1383 and graphical interface 138, via computer bus 101. In the exemplary embodiment, operating system 136 takes the form of a version of the MICROSOFT® WINDOWS® operating system, and browser 1383 takes the form of a version of MICROSOFT® INTERNET EXPLORER®, In addition, operating system 136 interacts, via computer bus 101, with the keyboard 134, the processor module 131, and the eReader software 140. For example, the keyboard 134 sends inputs, via computer bus 101, to the operating system 136. The operating system 136 determines that the eReader software 140 is active, accepts the eReader software input as data and stores that data temporarily in memory 132 (e.g. RAM). Each instruction from the eReader software 140 is sent by the operating system 136, via computer bus 101, to the processor module 131. These instructions are intertwined with instructions from other programs that the operating system 136 is overseeing before being sent to the processor module 131. Operating system 136 and browser 1383 not only receive inputs from keyboard 134, but also support rendering of graphical user interfaces within graphical interface 138.

Graphical interface 138 includes a browser 1383 and an eReader display 1381. When the eReader software 140 is launched, an eReader display 1381 is defined in memory 132 and rendered on graphical interface 138. Upon rendering, the graphical interface 138 presents the data in association with the set of instructions from the eReader software 140 as further discussed herein the context of the exemplary interfaces.

Figure 1B:
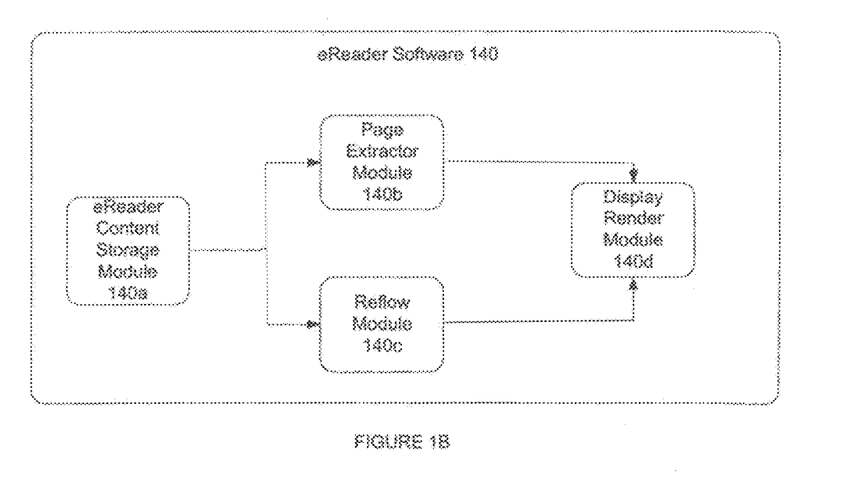
FIG. 1B is exemplary eReader software 140 which corresponds to one or more embodiments of the invention.

FIG. 1B illustrates an exemplary embodiment of an eReader software 140. In some embodiments, the eReader software 140 may be downloaded from server 120 via a signal transmission channel 150 over a wireless or wireline communications network (not shown). The eReader software 140 is configured to execute a set of modules from memory 132. The modules include an eReader content storage module 140*a*, a page extractor module 140*b*, a reflow module 140*c*, and a display render module 140*d*. Each module is described herein. The eReader content storage module 140*a* takes the exemplary form of one or more electronic, magnetic, and/or optical data-storage devices. The eReader content storage module 140*a* is configured to receive a markup language file and a page number map 111. The markup language file includes a portion of primary text and a portion of secondary text. Next, if the content supports retrieval by page number as described above, the page extractor module 140*b* is adapted to extract the page number map 111. In order to extract the page number map, the page extractor module 140*b* executes a page extractor algorithm 2100. The page extractor algorithm 2100 uses the page number map to extract information regarding a user selected page. This extraction, ultimately, aids in displaying that user selected page (refer to FIG. 2A and corresponding description for further discussion of the page extractor algorithm 2100). If the content does not support page breaks, the reflow module 140*c* is adapted to execute. After either the page extractor module 140*b* or reflow module 140*c*, in operation, has completed execution, the display render module 140*d* is configured to render the portion of primary text associated with a print page and the portion of secondary text associated with the print page.

Exemplary Method as Conducted by System 100

Referring now to FIG. 2, system 100 is configured to implement method 200, which may be adapted to incorporate the capabilities, functions, systems, and interfaces of the present invention. Method 200 includes functional blocks 202-210. These functional blocks are steps that perform actions including assignments, decisions, assessments and other like functions.

Prior to method 200 commencing, an eBook publisher, for example, takes an XML markup file and marks the location of the footnotes (i.e., secondary text), the location of the print page breaks in the body (i.e., primary text) and the location of the print page breaks in the footnotes. Afterwards, the XML markup file is uploaded to server 120. Then beginning at step 202, the generation of a page number map 111 occurs on server 120, in particular in the page map module 123. The generation of the page number map 111 occurs, preferably, on server 120 to simplify the computation time on the access device 130. The page map module 123 utilizes the marked up footnotes and print page break information to generate the page number map 111 for the XML markup file. In addition, the page number map 111 and associated markup language file may be stored on server 120, more particularly in content database 124. Once the page number map 111 is generated, the process moves to step 204.

In step 204, the page number map 111 and markup language file are transmitted and/or received, via a signal transmission channel 150, and stored, for example, on a mobile access device, more particularly in the eReader content storage module 140*a*. However in some embodiments, a user may have to authenticate his/her credentials before the page number map 111 and associated markup language file can be transmitted, received and/or stored. After the storing step, the process proceeds to step 206.

In step 206, if the content supports retrieval by page number, a user may choose to view the content in an electronic pagination view. In exemplary embodiments there are two views: electronic pagination view and reflow style view. Reflow style views/presentations are known to those skilled in the art. Electronic pagination view presents the data (i.e. content) as comparable to paper print pagination. See FIGS. 3-4 for exemplary interfaces on pagination view. When the electronic pagination view is selected, the page number map 111 is utilized and extracted via the page extractor module 140 *b*. More particularly, the page extractor module 140 *b* executes, via processor module 131, the page extractor algorithm 2100.

Figure 2A:
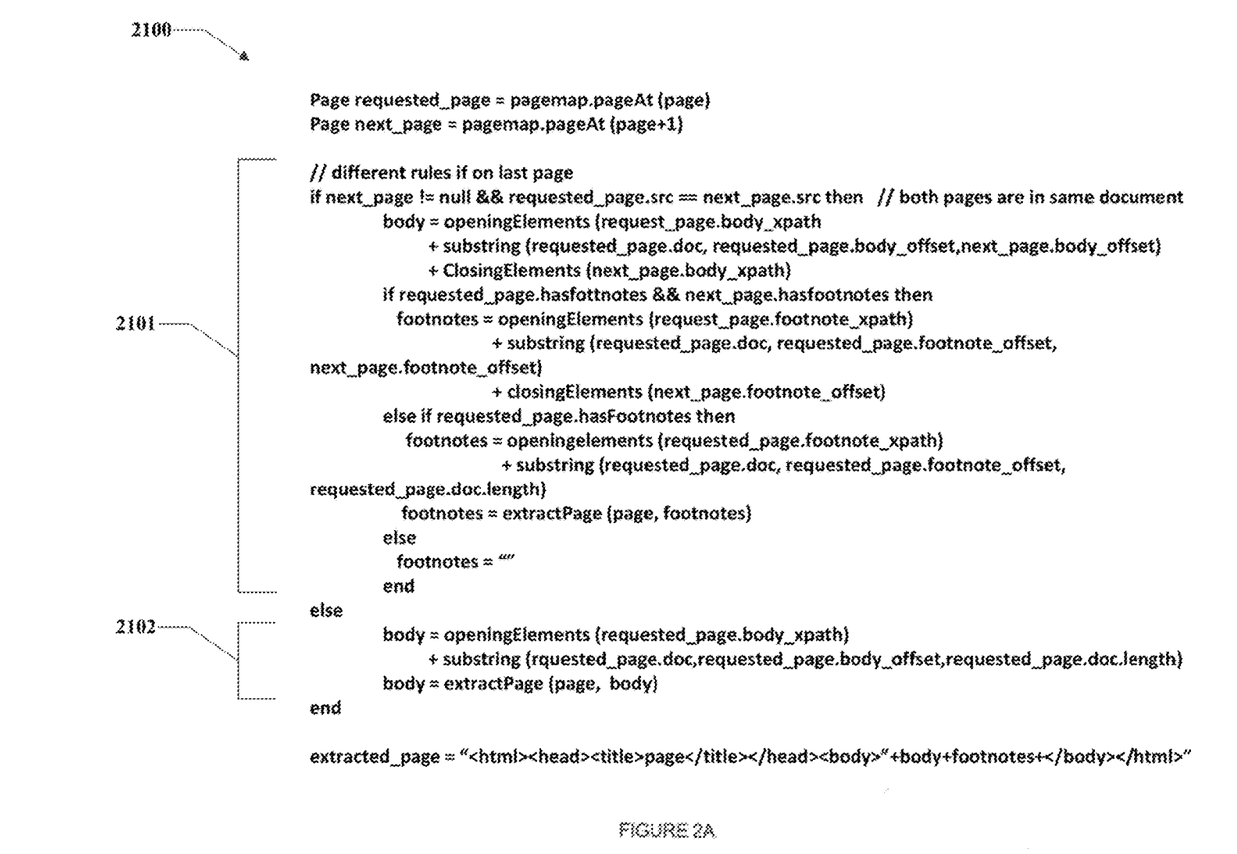
FIG. 2A is an exemplary page extractor algorithm 2100 which corresponds to one or more embodiments of the invention.

FIG. 2A, is an exemplary page extractor algorithm 2100. In this instance, the exemplary page extractor algorithm 2100 has two code sections; 1) code to handle beginning and/or middle print page information 2101 and 2) code to handle end print page information 2102. Since the page number map 111 is directly correlated with the print page break information, the end print page does not have a print page break at the end of the markup language file. The algorithm determines if the electronic page the user wants to view is the end page. If so, the code that handles end print page information via code 2102 of FIG. 2A and ultimately assists in rendering and displaying the last electronic page to the user. Otherwise, the code that handles beginning and/or middle print page information via code 2101 of FIG. 2A and ultimately assists in rendering and displaying the user-selected electronic page to the user. Once the page number map 111 is utilized, the process advances to step 208.

In step 208, the page number map 111 assists in rendering a portion of primary text associated with a print page and a portion of secondary text associated with a print page. Rendering processes are known to those skilled in the art. As described further herein, only the selected electronic page is rendered. For instance, a page number map 111 is utilized to view page 1 and then navigate to page 15 without the access device 130 needing to retrieve pages 1 through 14, from the eReader content storage 140*a*, before rendering and ultimately displaying page 15. Thus, allowing the access device 130 to only process the portion of the markup language file that contains the selected electronic page. Using the page number map to render the selected electronic page improves the performance of displaying the electronic page view and/or navigating to another selected electronic page. Once the portions are rendered, the process executes step 210.

In step 210, the portions of primary and secondary text associated with a print page are displayed for the user. Display systems and interfaces are described herein and/or are known to those skilled in the art. In particular, reference FIGS. 3-4 for exemplary interfaces illustrating portions of primary and secondary text associated with a print page.

Exemplary Interfaces

Figure 4:
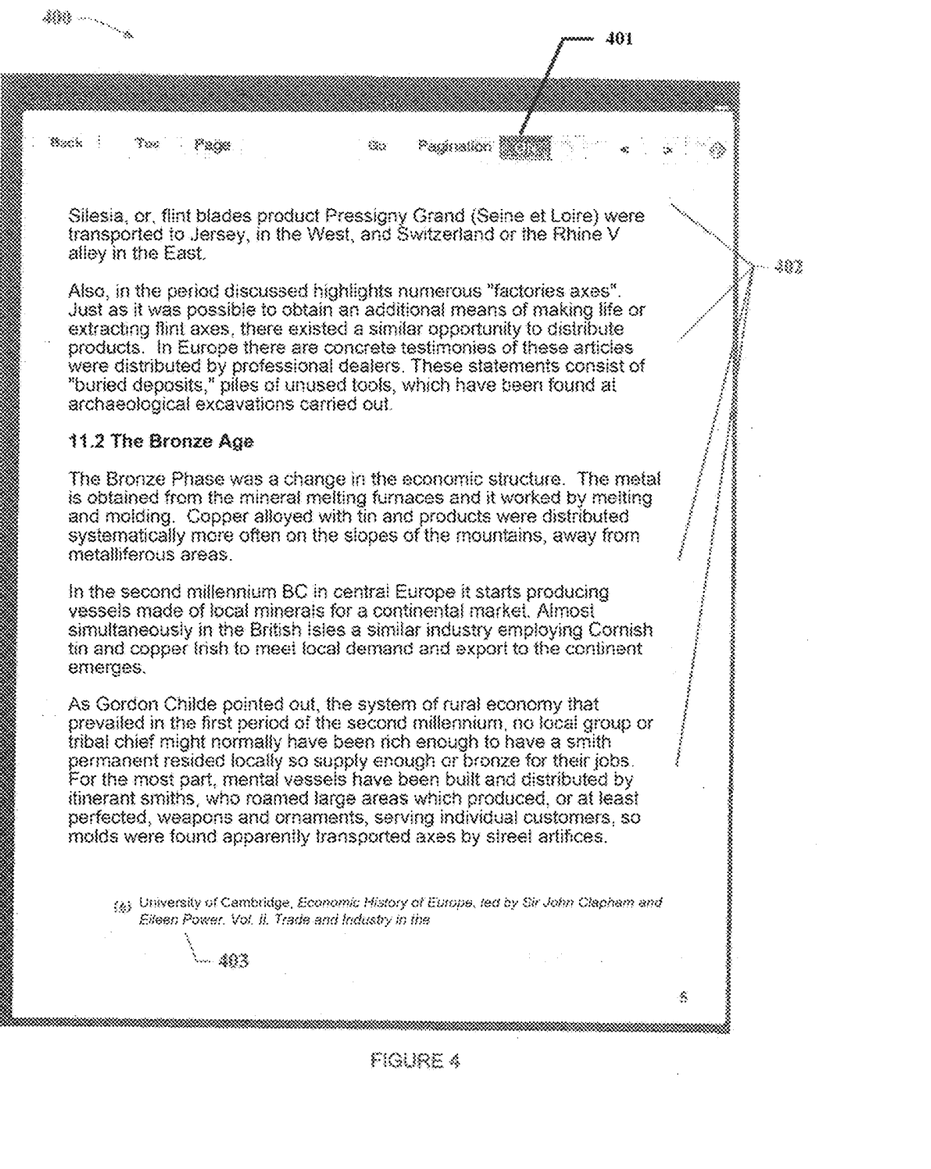
FIG. 4 is an exemplary interface 400 which corresponds to one or more embodiments of the invention.

FIGS. 3-4 show exemplary interfaces for system 100 and method 200, which may be adapted to incorporate the capabilities, functions, systems and methods of the present invention.

FIG. 3 illustrates an exemplary eReader display 1383 on an access device 130, for example, a laptop, FIG. 4 illustrates another exemplary eReader display 1381 on an access device 130 for this example, an APPLE® IPAD® tablet. EReader display 1381 displays an electronic print page. For example, in FIGS. 3-4, the user has elected to view page 5 within the eBook, Consequently, page 5 in the eBook is the same page 5 as the print page 5.

In order to display and view page 5, a few functions, steps and/or systems take place beforehand. First, a page number map 111 is generated, on server 120, before the user even purchases the eBook. The eBook contains primary text and secondary text. The eBook (e.g. a markup language file) and associated page number map 111 are then stored in content database 124 and ready for purchase. Next, a user elects to purchase and ultimately download (i.e., receive and store) the eBook to an access device 130, particularly the eReader content storage module 140a. After the eBook and associated page number map are stored, the user may access the eBook at any time (assuming successful authentication). When the user chooses to view the eBook, a display view choice of reflow or pagination appears. Referring back to FIG. 4, if the user selects the pagination "ON" button 401, behind the scenes and unbeknownst to the user, method 200 as conducted by system 100 sends the page number map 111 for the eBook to a page extractor module 140b. The page extractor module 140b, using a page extractor algorithm 2100, extracts the page number map information for the particular user selected page (in this instance, page 5). Once the information is extracted, the page 5 information and text get rendered by a display rendering module 140d. Finally, the rendered page 5 text gets displayed on the eReader display 1381. For instance, page 5 in FIG. 4 includes primary text 402 and secondary text 403. The body text is the primary text 402 and the footnote (6) is the secondary text 403. Therefore, the electronic page 5 should look very similar, if not identical, to what page 5 looks like when in print, including footnotes or any other secondary text.

In addition, other exemplary embodiments, while in pagination mode, allow the user to modify the font size of the page(s). Methods of changing font size are known to those skilled in the art. However, the modification of the font size should take into account that the electronic page needs to display similar to the print page, including any secondary text. Therefore, scrolling functionality may have to be utilized to provide the user the best viewing experience of preferred font size and content display.

The embodiments described above and in the claims are intended only to illustrate and teach one or more ways of practicing or implementing the present invention, not to restrict its breadth or scope. For example, the eReader software 140 may be stored elsewhere besides the memory 132 of the access device 130. Any location within the access device 130 where data can be temporarily and/or permanently stored is acceptable. Another example, FIG. 1 shows browser 1383 and eReader display 1381 as having the ability to display simultaneously; however, in operation, some embodiments may present them at separate times (Please check these reference numbers and descriptions). The actual scope of the invention, which embraces all ways of practicing or implementing the teachings of the invention, is defined by the claims and their equivalents.

The invention claimed is:

1. A method comprising:
   receiving a markup language file, the markup language file comprising a portion of primary text and a portion of secondary text, said portion of secondary text comprising at least one footnote;
   receiving a page number map, said page number map comprising a print page number reference, a content document identification, a first print page break lineage and a first character offset for the portion of primary text, and a second print page break lineage and a second character offset for the portion of secondary text and a total page count,
   the first print page break lineage comprises a path from a first print page break markup element of the markup language file associated with the portion of primary text to a root element of the markup language file,
   the second print page break lineage comprises a path from a second print page break markup element of the markup language file associated with the portion of secondary text to the root element of the markup language file,
   each of the first character offset and the second character offset being data values derived from a beginning of the markup language file,
   the total page count being a data value for use in allocation of sufficient memory space on an eBook access device; and
   utilizing the first print page break lineage of the page number map to identify the first print page break markup element of the markup language file associated with the portion of primary text and render on the eBook access device the portion of primary text associated with a single print page; and
   utilizing the second print page break lineage of the page number map to identify identify the first print page break markup element of the markup language file associated with the portion of primary text and render on the eBook access device the portion of secondary text associated with the single print page.

2. The method of claim 1 further comprising purchasing an electronic book, the electronic book comprising the markup language file.

3. The method of claim 2 further comprising:
   providing a set of user credentials for authentication; and
   in response to a successful authentication of the set of user credentials, receiving the markup language file and the page number map.

4. The method of claim 1 wherein the markup language file is a XML file.

5. The method of claim 1 wherein the portion of the primary text is a portion of a legal treatise.

6. A method comprising:
   transmitting a markup language file, the markup language file comprising a portion of primary text and a portion of secondary text, the portion of primary text being associated with a print page and the portion of secondary text being associated with the print page, said portion of secondary text comprising at least one footnote;
   transmitting a page number map, the page number map adapted to render on an eBook page the portion of primary text and the portion of secondary text and comprising a print page number reference, a content document identification, a first print page break lineage and a first character offset for the portion of primary text, a second print page break lineage and a second character offset for the portion of secondary text and a total page count, the print page exemplifies how a page looks in paper print format and being a singular page, the first print page break lineage comprises a path from a first print page break markup element of the markup language file associated with the portion of primary text to a root element of the markup language file, the second print page break lineage comprises a path from a second print page break markup element of the markup language file associated with the portion of secondary text to the root element of the markup language file, each of the first character offset and the second character offset being data values derived from a beginning of the markup language file, the total page count being a data value for use in allocation of sufficient memory space on an eBook access device;

utilizing the first print page break lineage of the page number map to identify the first print page break markup element of the markup language file associated with the portion of primary text and render on the eBook access device the portion of primary text associated with a single print page; and utilizing the second print page break lineage of the page number map to identify the first print page break markup element of the markup language file associated with the portion of primary text and render on the eBook access device the portion of secondary text associated with the single print page.

7. The method of claim 6 further comprising storing a purchased electronic book, the purchased electronic book comprising the markup language file.

8. The method of claim 6 further comprising:
authenticating a set of user credentials; and
in response to successfully authenticating the set of user credentials, transmitting the markup language file and the page number map.

9. The method of claim 6 wherein the markup language file is a XML file.

10. The method of claim 6 wherein the portion of the primary text is a portion of a legal treatise.

11. An access device comprising:
a non-transitory processor; and
a non-transitory memory coupled to the processor,
the non-transitory memory storing an eReader program stored in the memory for execution by the processor, the eReader program comprising:
an eReader content storage module configured to receive a markup language file and a page number map, the markup language file comprising a portion of primary text and a portion of secondary text, the page number map comprising a print page number reference, a content document identification, a first print page break lineage and a first character offset for the portion of primary text, a second print page break lineage and a second character offset for the portion of secondary text and a total page count, the first print page break lineage comprises a path from a first print page break markup element of the markup language file associated with the portion of primary text to a root element of the markup language file, the second print page break lineage comprises a path from a second print page break markup element of the markup language file associated with the portion of secondary text to the root element of the markup language file, each of the first character offset and the second character offset being data values derived from a beginning of the markup language file, the total page count being a data value for use in allocation of sufficient memory space on the access device;

a page extractor module configured to utilize the first print page break lineage of the page number map in order to identify the first print page break markup element of the markup language file associated with the portion of primary text and render on the access device the portion of primary text associated with a single print page and the second print page break lineage of the page number map in order to identify the first print page break markup element of the markup language file associated with the portion of primary text and render the portion of secondary text associated with the single print page; and a display render module configured to render on an eBook page the portion of primary text associated with the single print page and the portion of secondary text associated with the single print page and, said portion of secondary text comprising at least one footnote, the single print page exemplifies how a page looks in paper print.

12. The device of claim 11 wherein the eReader content storage module is configured to store the markup language and the page number map.

13. The device of claim 11 wherein the markup language file is a XML file.

14. The device of claim 11 wherein the portion of the primary text is a portion of a legal treatise.

\* \* \* \* \*